July 5, 1932.  J. L. DRAKE  1,865,890
PROCESS AND APPARATUS FOR SHEET GLASS MANUFACTURE
Filed Dec. 20, 1929  2 Sheets-Sheet 1
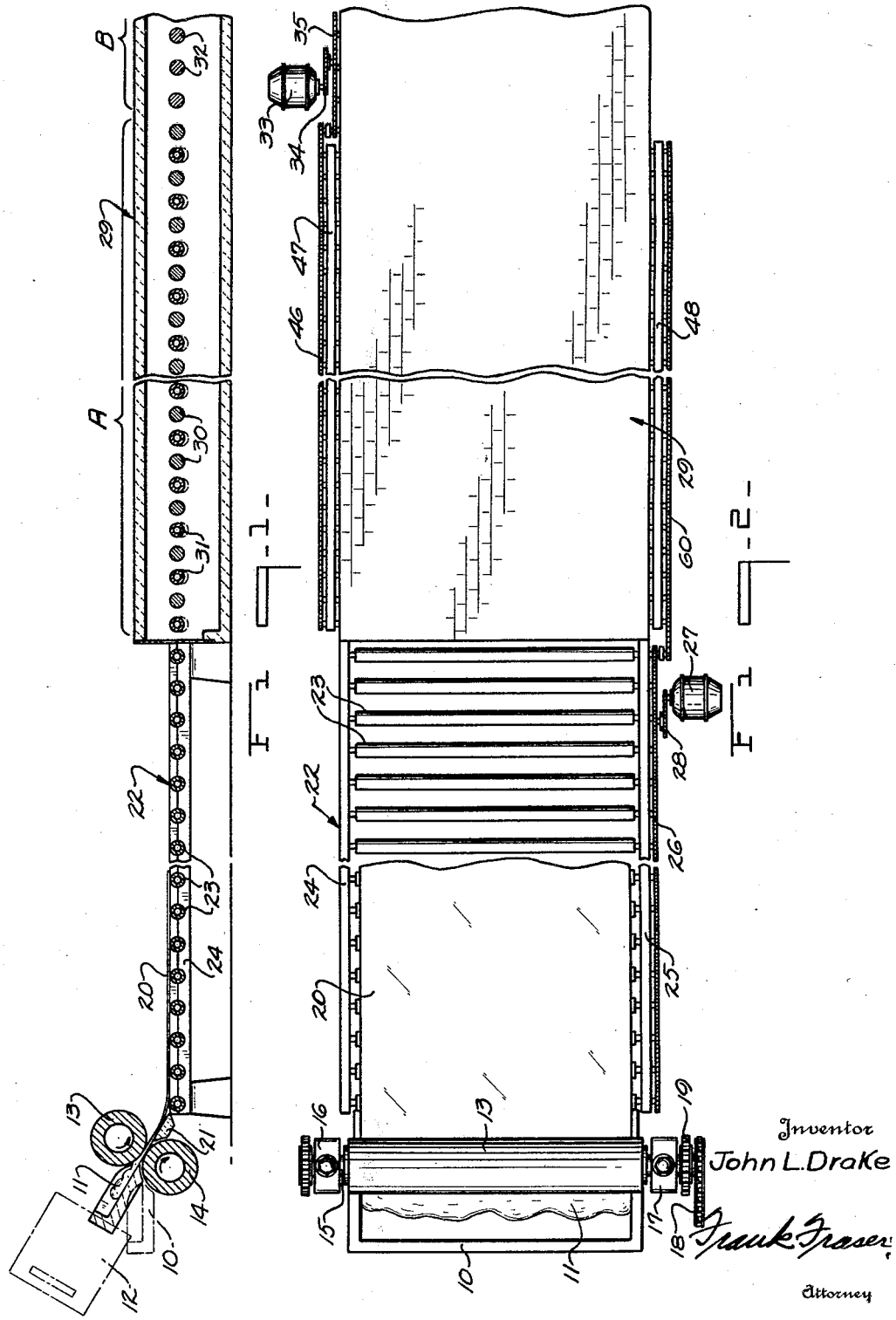

July 5, 1932. J. L. DRAKE 1,865,890
PROCESS AND APPARATUS FOR SHEET GLASS MANUFACTURE
Filed Dec. 20, 1929 2 Sheets-Sheet 2
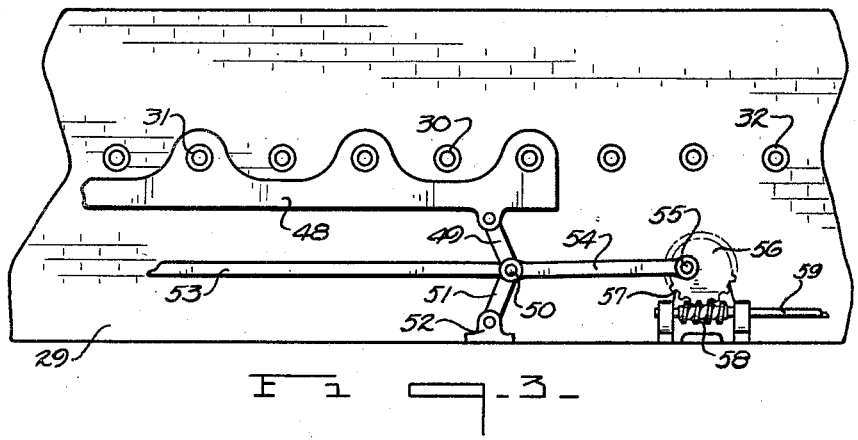
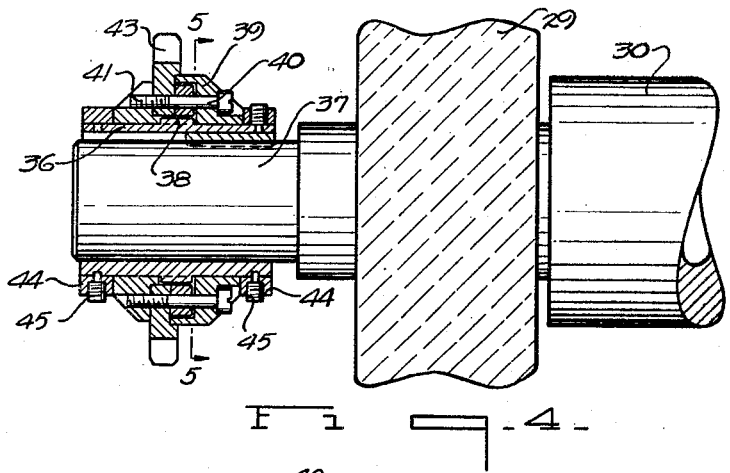
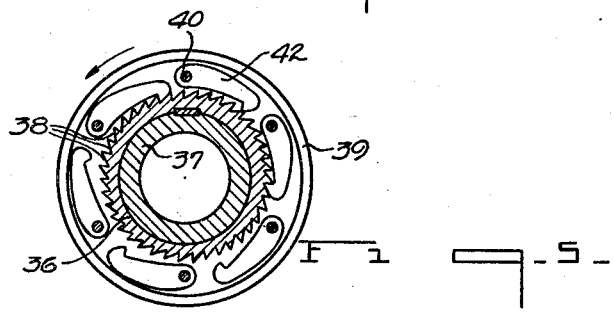
Inventor
John L. Drake
By Frank Fraser
Attorney Patented July 5, 1932

1,865,890

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR SHEET GLASS MANUFACTURE

Application filed December 20, 1929. Serial No. 415,372.

This invention relates to a process and apparatus for forming and annealing sheet or plate glass.

In the production of successive sheets of glass by an intermittent rolling operation, it is desirable that the formation of the sheet be performed at a relatively great speed as compared to the speed at which it travels in annealing. This rapid formation of the glass sheet is desirable from both the standpoint of production and quality while the travel of the sheet during annealing is necessarily slow in order to avoid making the annealing apparatus of great length.

An important object of the present invention resides in the provision of a process and apparatus whereby successive sheets of glass may be intermittently formed at a relatively high rate of speed and subsequently annealed while traveling at a relatively slower speed.

Another object of the invention is the provision of a process and apparatus for effecting a reduction in the speed of travel of the sheet as it is being carried forwardly whereby the movement of the sheet can be dropped from its relatively high forming speed to a relatively slower annealing speed in an easy, convenient and efficient manner.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through apparatus provided by the present invention, Fig. 2 is a plan view thereof, Fig. 3 is a side elevation of a portion of the annealing leer showing the means for effecting vertical movement of certain of the high speed rolls, Fig. 4 is a sectional detail view of the overrunning clutch associated with certain of the low speed rolls, and Fig. 5 is a section taken substantially on line 5—5 of Fig. 4.

Referring to the drawings, 10 designates a receiver or support adapted to receive thereupon a mass or charge of molten glass 11 from a pot or other suitable receptacle 12. The mass of molten glass 11 is preferably supplied to the receiver when the same is in a substantially horizontal position as indicated by the broken lines in Fig. 1, after which the pot 12 is removed and the receiver tilted upwardly to cause the molten glass to move downwardly between the forming rolls 13 and 14. The forming rolls are spaced from one another to create a sheet forming pass therebetween and are mounted upon shafts 15 rotatably supported at their opposite ends by members 16 and 17.

As brought out above, it is desirable that the molten glass 11 be rapidly reduced to sheet form. The forming rolls 13 and 14 are consequently driven at a relatively high peripheral speed so that they will effect the rapid formation of the sheet. One of the forming rolls may be positively driven by suitable driving means 18 and the other roll driven from the first roll through intermeshing gears 19 mounted upon the roll shafts 15.

The glass sheet or plate made by the forming rolls is indicated at 20 and the said sheet is supported as it leaves said rolls upon an inclined runway or chute 21. Positioned in proximity to this chute and adapted to receive the glass sheet or plate therefrom is a horizontal conveyor table indicated in its entirety by the numeral 22 and being preferably composed of a plurality of horizontally aligned rolls 23 rotatably supported at their opposite ends by the side frames 24 and 25. The rolls 18 may be driven in any desired manner such as by associating with each roll a sprocket (not shown) and in training about all of these sprockets a single sprocket chain 26 driven from a motor 27 through suitable reduction gearing 26.

Arranged at the end of the conveyor table 22 is an annealing leer 29 containing a large number of sheet supporting rolls which are divided into two units or sections A and B, the section A being termed the receiving or transfer section, and B the annealing section. The transfer section A is composed of a plurality of low speed rolls 30 (driven at annealing speed) and a plurality of high speed rolls 31 (driven at rolling speed), the low speed rolls and high speed rolls being arranged alternately with one another, as shown. The annealing section B of the leer is composed of a plurality of low speed rolls 32 arranged in horizontal alignment with the rolls 23, 30, and 31 when the high speed rolls 31 are in their elevated or sheet supporting position, these rolls being vertically adjustable as a unit as will be more clearly hereinafter apparent. The rolls 32 of section B are driven at a constant annealing speed from a motor 33 through suitable reduction gearing 34 and a chain and sprocket drive 35, the sprockets (not shown) being associated with the rolls and the sprocket chain 35 being trained thereabout.

According to the invention, each of the low speed rolls 30 of section A of leer 29 is adapted to be positively driven at a relatively slow speed substantially equal to the speed of the rolls 32 of section B. However, the rolls 30 are free to overrun so that while they are positively driven at a slow speed, they may be rotated by the sheet passing thereover at a greater speed and thereby caused to overrun their driving means. This is herein accomplished by the provision of overrunning clutches which may be of the type illustrated in Figs. 4 and 5. These overrunning clutches each include a sleeve 36 keyed to the shaft 37 of the respective low speed roll 30, said sleeve being provided with ratchet teeth 38. Encircling the sleeve 36 is a ring 39 through which extend a plurality of pivot pins 40, screw-threaded at one end as at 41 to prevent accidental displacement thereof. The pins 40 carry pawls 42 and also a sprocket wheel 43. The collars 44 and screws 45 are provided to prevent accidental displacement of the ring 39 and associated parts. The sprocket wheels 43 of the various low speed rolls have trained thereabout a sprocket chain 46 preferably driven from the motor 33 which drives the low speed rolls 32, although a separate drive can be provided for these rolls if desired. Thus, the rolls 30 and 32 are adapted to be positively driven in unison at substantially the same speed.

The sprocket wheels 43 are adapted to be positively driven in the direction indicated by the arrow in Fig. 5. Normally, the pawls 42 engage the teeth 38 on sleeve 36 to positively drive the rolls 30. In the event, however, that the linear speed of the glass sheet 20 exceeds the peripheral speed of the rolls, the sheet is allowed to drive the rolls faster than they are positively driven due to the frictional contact between the sheet and rolls. When this occurs, the pawls 42 simply ride freely over the teeth 38 upon rotation of sleeve 36.

The present invention also consists in mounting the high speed rolls 31 of leer section A so that they can be raised and lowered as a unit with respect to the low speed rolls 30 to the end that the said high speed rolls can be moved into or out of supporting contact with the sheet, the purpose of such arrangement being to provide for the change in the speed of travel of the sheet from its relatively high forming speed to its relatively slower annealing speed as will be more clearly hereinafter apparent. Thus, the high speed rolls 31 project at their opposite ends beyond the side walls of the leer and are rotatably supported by the horizontal supporting frames 47 and 48, said frames being movable vertically to raise and lower the rolls carried thereby as a unit with respect to rolls 30. This vertical adjustment may be achieved in many different ways, but as herein shown for the purposes of illustration, each side frame 47 and 48 has pivoted thereto adjacent its front and rear ends a depending link 49 pivotally connected with a shaft or pin 50 to which is also pivotally connected a link 51, said link being pivoted at its lower end to a fixed block 52. Connecting the pins 50 at the front and rear ends of each side frame 47 and 48 is a rod 53 and pivotally associated with one of said pins 50 is a pitman 54 pivoted as at 55 to an eccentric 56, said eccentric carrying a gear 57 meshing with and driven from a worm 58 carried by drive shaft 59. Suitable means may be provided for connecting the raising and lowering mechanism at the opposite sides of the leer so that the opposite ends of the rolls will be raised and lowered simultaneously the same distance to maintain the said rolls always in a horizontal position.

When the high speed rolls 31 are in their elevated position so that they are in horizontal alignment with the low speed rolls 30, the parts of the raising and lowering mechanism assume the position indicated in Fig. 3 with the links 49 and 51 in a substantially extended position. When it is desired to lower the rolls 31, however, the eccentrics 56 are rotated so as to cause a folding or collapsing of the said links whereupon the lowering of the rolls will take place. The high speed rolls 31 may be driven from the motor 27 through driving means 60 as shown or a separate drive for the rolls 31 may be provided if preferred.

When it is desired to form a glass sheet or plate 20, the high speed rolls 31 are raised to the same level as the low speed rolls 30 so that both sets of rolls will function to support the glass sheet thereupon as it is delivered into the receiving section A of the leer. A mass of molten glass 11 is then deposited upon the receiver 10 and moved therefrom to the forming rolls 13 and 14 and reduced thereby to sheet form at a relatively high rate of speed such as for example in the neighborhood of sixty feet per minute. During the formation of the sheet, the rolls 23 and 31 are positively driven at rolling speed while the rolls 30 and 32 are positively driven at a much slower annealing speed which may be for example approximately five feet per minute. As the glass sheet 20 is received upon the rolls 23, it is carried forwardly at its speed of formation and delivered at such speed into the leer 29 wherein it is initially supported upon the rolls 30 and 31 of the receiving section A. The high speed rolls 31 function to carry the sheet forwardly at its speed of formation and during this period of travel of the sheet, and due to the provision of the overrunning clutches, the low speed rolls will be caused to overrun their driving means and thereby synchronize with the high speed rolls. Thus, as the sheet is received upon the rolls of the receiving section A of the leer, it will overrun the low speed rolls 30 and be carried forwardly by the high speed rolls 31. After the entire sheet has been received upon the leer section A, however, the high speed rolls 31 are lowered away from and out of contact with the glass sheet 20 with the result that the rolls 30 will be permitted to slow down and thus effect a corresponding slowing in the forward travel of the sheet. When the rolls 30 have slowed down to the annealing speed, they will be positively driven at such speed so as to deliver the sheet onto the rolls 32 which serve to carry the same forwardly through the leer at a constant annealing speed which may be, as above stated, approximately five feet per minute. After the glass sheet passes from the rolls 30 onto the rolls 32, the high speed rolls 31 are again raised to the sheet supporting level whereupon a second sheet may be formed.

From the above, it will be seen that while the sheet is formed at a relatively high rate of speed, it will be delivered into the annealing section B of the leer and carried therethrough at a relatively slower leering speed. Thus, by the use of the present invention, it is possible to attain those advantages incident to the rapid formation of the sheet and likewise those advantages which result from slower annealing of the glass. The change in the speed of travel of the sheet is also effected without the necessity of stopping the sheet or shifting the same either vertically or laterally. The relative speeds herein given are merely by way of example and inasmuch as a wide range of speeds may be used, the invention is not limited to the specific speeds mentioned. Also other types of driving means for the rolls may be used and likewise other raising and lowering mechanism.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a conveyor for receiving a newly formed sheet from a forming machine and delivering it into an annealing zone, including two sets of rolls adapted to be arranged at times in the same horizontal plane for simultaneously engaging the sheet and carrying it forwardly, means for positively driving said sets of rolls in the same direction at different speeds, means for raising and lowering one set of rolls with respect to the second set of rolls, and means associated with the second set of rolls for allowing said rolls to synchronize with the rolls of the first set.

2. In sheet glass apparatus, a conveyor for receiving a newly formed sheet from a forming machine and delivering it into an annealing zone, including two sets of rolls adapted to be arranged at times in the same horizontal plane for simultaneously engaging the sheet and carrying it forwardly, the rolls of one set being arranged alternately with the rolls of the other set, means for positively driving one set of rolls at a relatively high speed, means for positively driving the other set of rolls at a relatively slower speed, means for raising and lowering the rolls driven at the higher speed relative to the rolls driven at the slower speed, and means associated with the low speed rolls for allowing said rolls to synchronize with the high speed rolls.

3. In sheet glass apparatus, means for receiving a newly formed sheet from a forming machine and delivering it into an annealing leer, including a conveyor section composed of alternately arranged high and low speed rolls adapted at times to simultaneously engage the sheet and carry it forwardly, overrunning clutches associated with the low speed rolls to permit them to synchronize with the high speed rolls, and means for raising and lowering the high speed rolls with respect to the low speed rolls.

4. In sheet glass apparatus, a conveyor for receiving a newly formed sheet from a forming machine and delivering it into an annealing leer, said conveyor being composed of alternately arranged high and low speed rolls, with the low speed rolls being stationary, means for raising and lowering the high speed rolls relative to the low speed rolls, said high speed rolls, when in raised position, being in a common plane with said low speed rolls, means for driving the high speed rolls at a constant relatively high speed, means for driving the low speed rolls at a constant relatively low speed, and means associated with the said low speed rolls for causing the same to overrun their driving means and synchronize with the high speed rolls.

5. In sheet glass apparatus, a conveyor for receiving a newly formed sheet from a forming machine and delivering it into an annealing leer, said conveyor including a plurality of horizontally aligned rolls constituting a constantly driven low speed section, two sets of rolls positioned in advance of the said conveyor section and constituting a second conveyor section, said second-named conveyor section being composed of alternately arranged high and low speed rolls, with the low speed rolls being stationary and in horizontal alignment with the rolls of the first-named conveyor section, means for raising and lowering the high speed rolls relative to the low speed rolls, said rolls when in raised position being in a common plane with the low speed rolls of both conveyor sections, means for driving the high speed rolls at a constant relatively high speed, means for driving the low speed rolls of the second-mentioned conveyor section at a relatively slow speed substantially equal to the speed of the rolls of the first-mentioned conveyor section, and means associated with the low speed rolls of said second-named conveyor section for causing said rolls to overrun their driving means and synchronize with the high speed rolls.

6. The method of handling newly formed sheets of glass, comprising carrying the glass sheet forwardly and delivering it at a relatively high rate of speed onto a series of rotatable supporting rolls, positively driving alternate rolls at a speed substantially equal to the speed at which the sheet is delivered thereupon, simultaneously positively driving the remaining rolls at a relatively slower speed, in causing the slow speed rolls to be driven by the sheet and thereby synchronized with the high speed rolls as the said sheet is delivered upon said rolls, and in then lowering the high speed rolls away from and out of contact with the sheet when said sheet reaches a predetermined position, thereby causing the forward speed of travel of the sheet to be reduced to a speed equal to that at which the slow speed rolls are positively driven.

7. The method of handling newly formed sheets of glass, comprising carrying the glass sheet forwardly and delivering it at a relatively high rate of speed onto a series of rotatable rolls divided into two separate sets which cooperate to simultaneously support the sheet, positively driving one set of rolls at a speed substantially equal to the speed at which the sheet is delivered thereupon, simultaneously positively driving the other set of rolls at a relatively slower speed, in causing the slow speed rolls to be driven by the sheet and thereby synchronized with the high speed rolls as the said sheet is delivered upon said rolls, and in then lowering the high speed rolls away from and out of contact with the sheet when said sheet reaches a predetermined position, thereby causing the forward speed of travel of the sheet to be reduced to a speed equal to that at which the slow speed rolls are positively driven.

Signed at Toledo, in the county of Lucas and State of Ohio, this 17th day of December, 1929.

JOHN L. DRAKE.